S. TOMPKINS.
AUTOMATIC SPEED REGULATOR.
APPLICATION FILED MAR. 10, 1914.

1,245,823.

Patented Nov. 6, 1917.
9 SHEETS—SHEET 1.

Witnesses:
Inventor
Stonewall Tompkins,
By Knight Bros
Attys

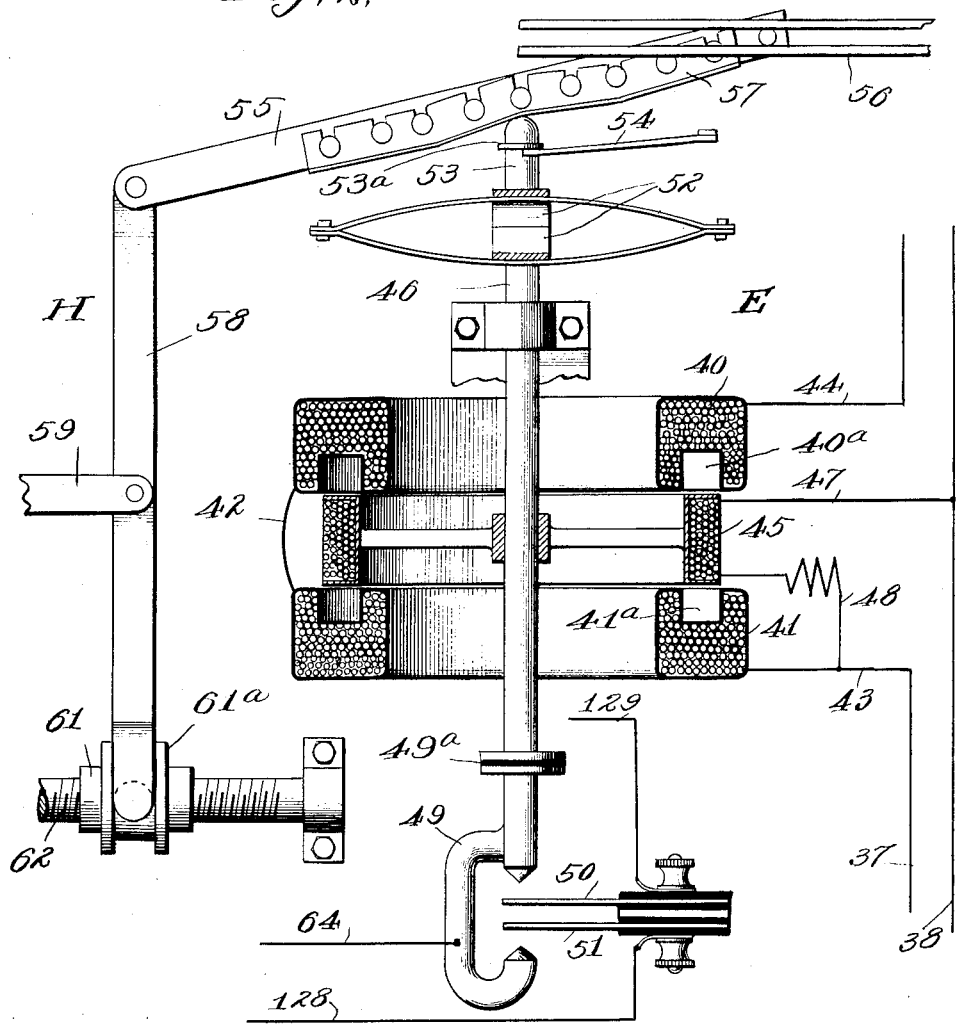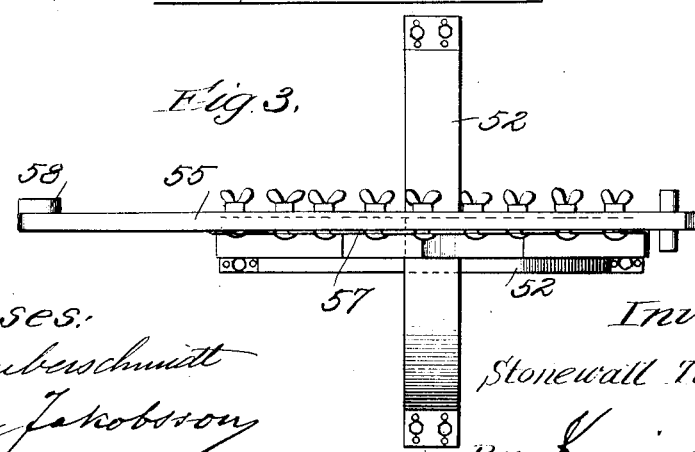

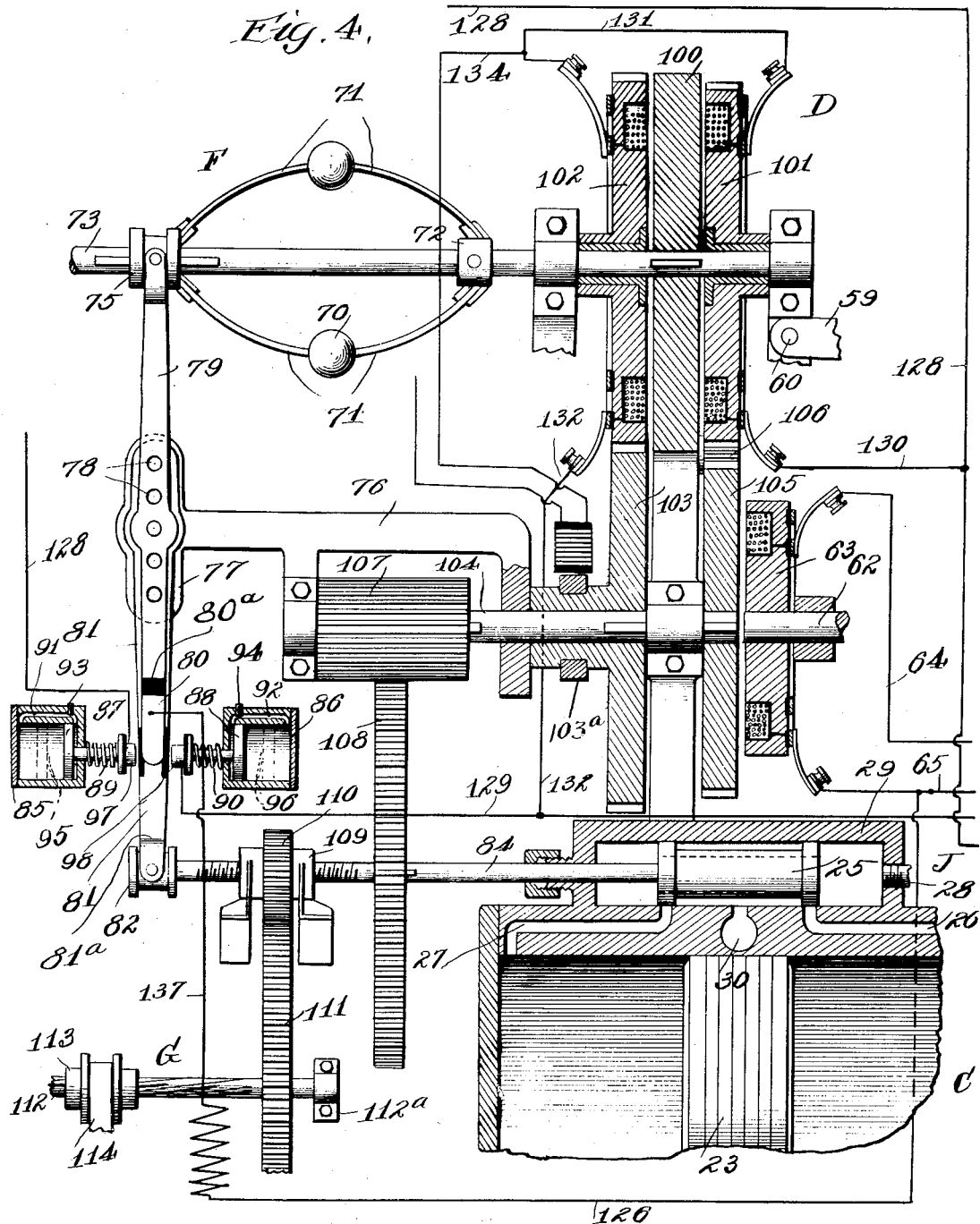

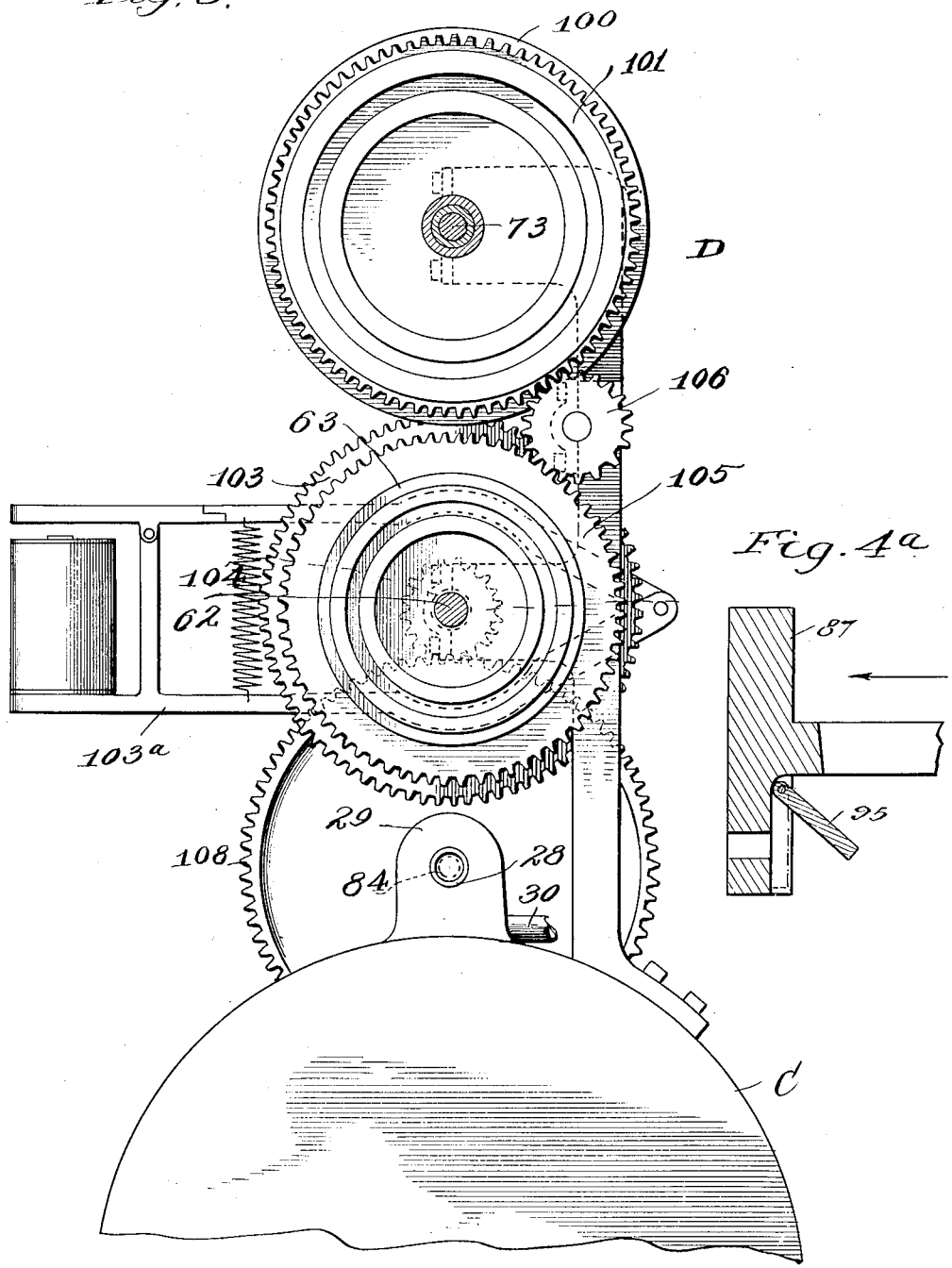

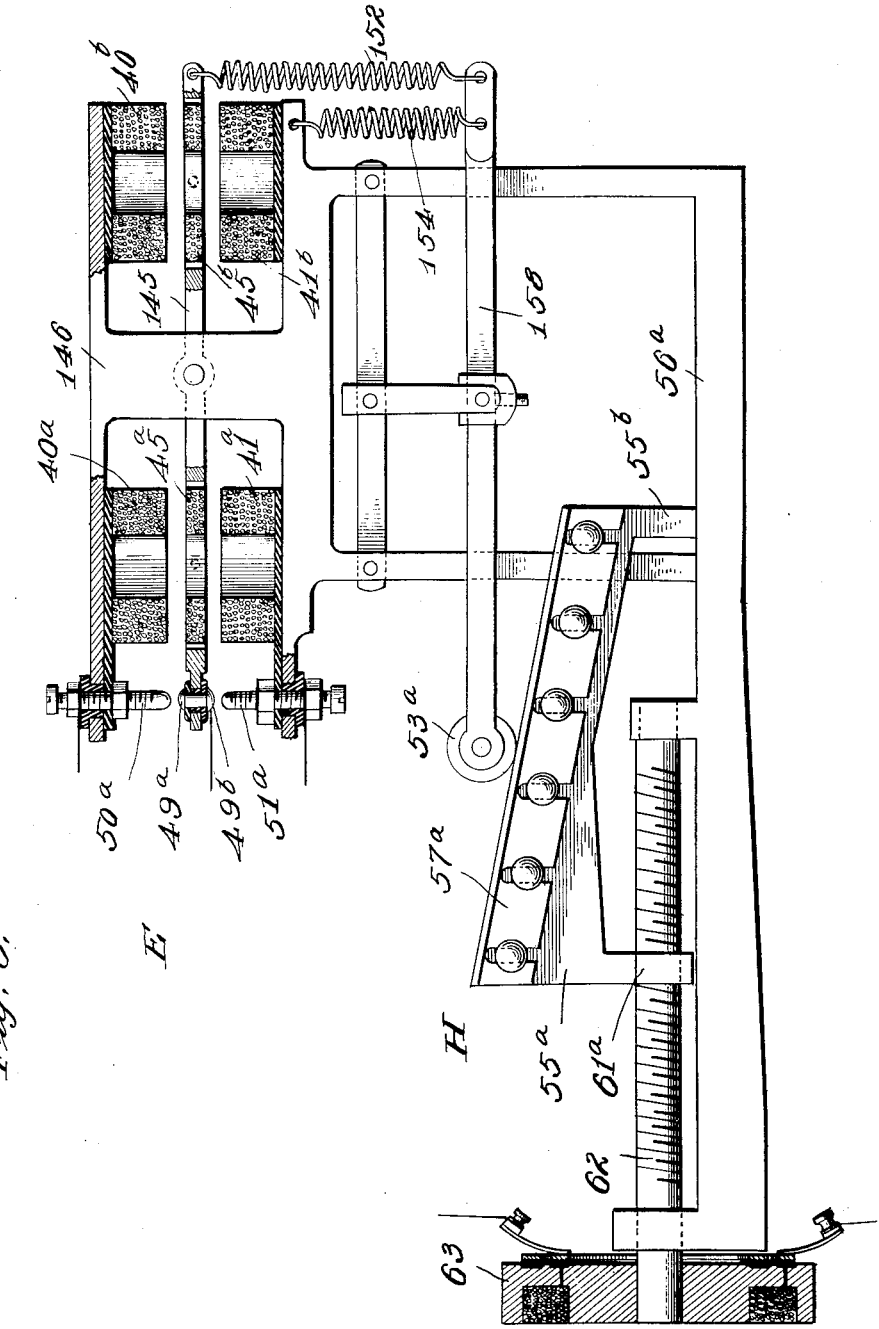

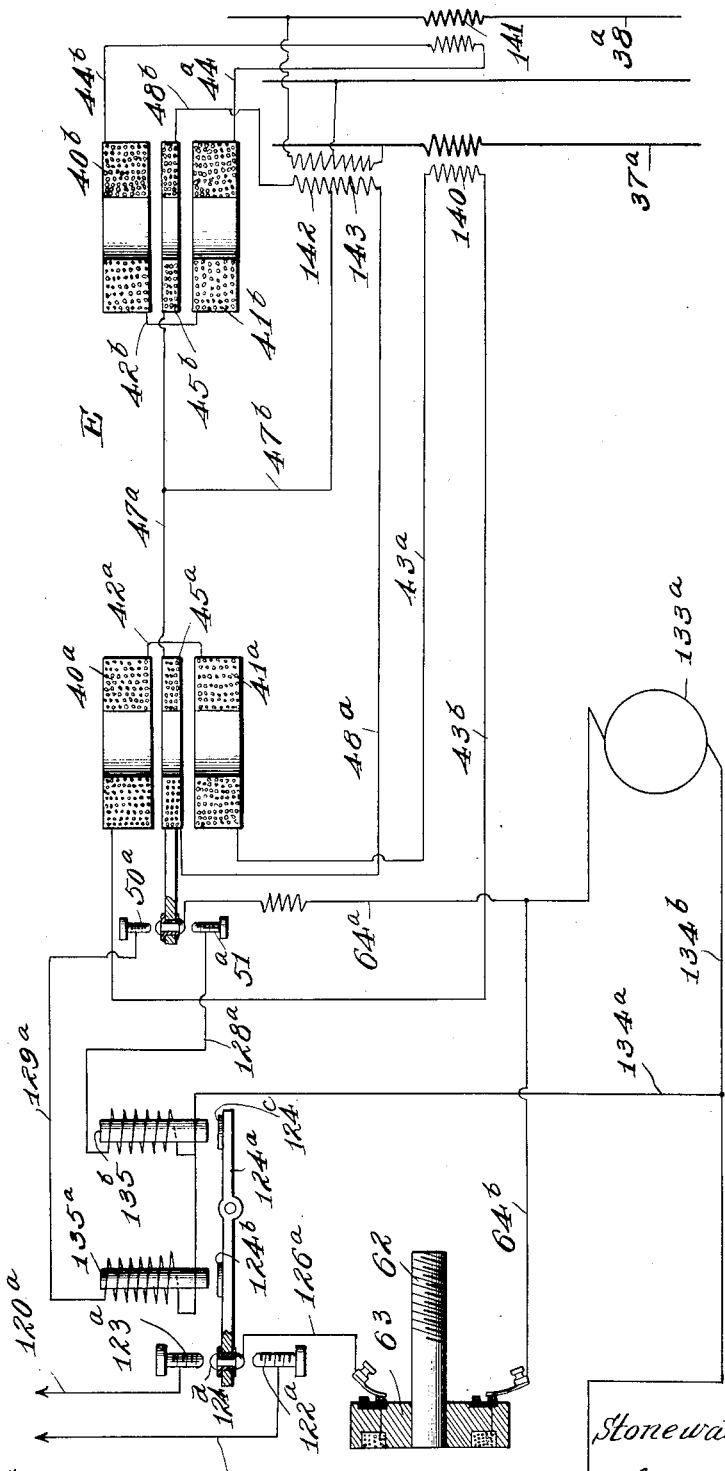

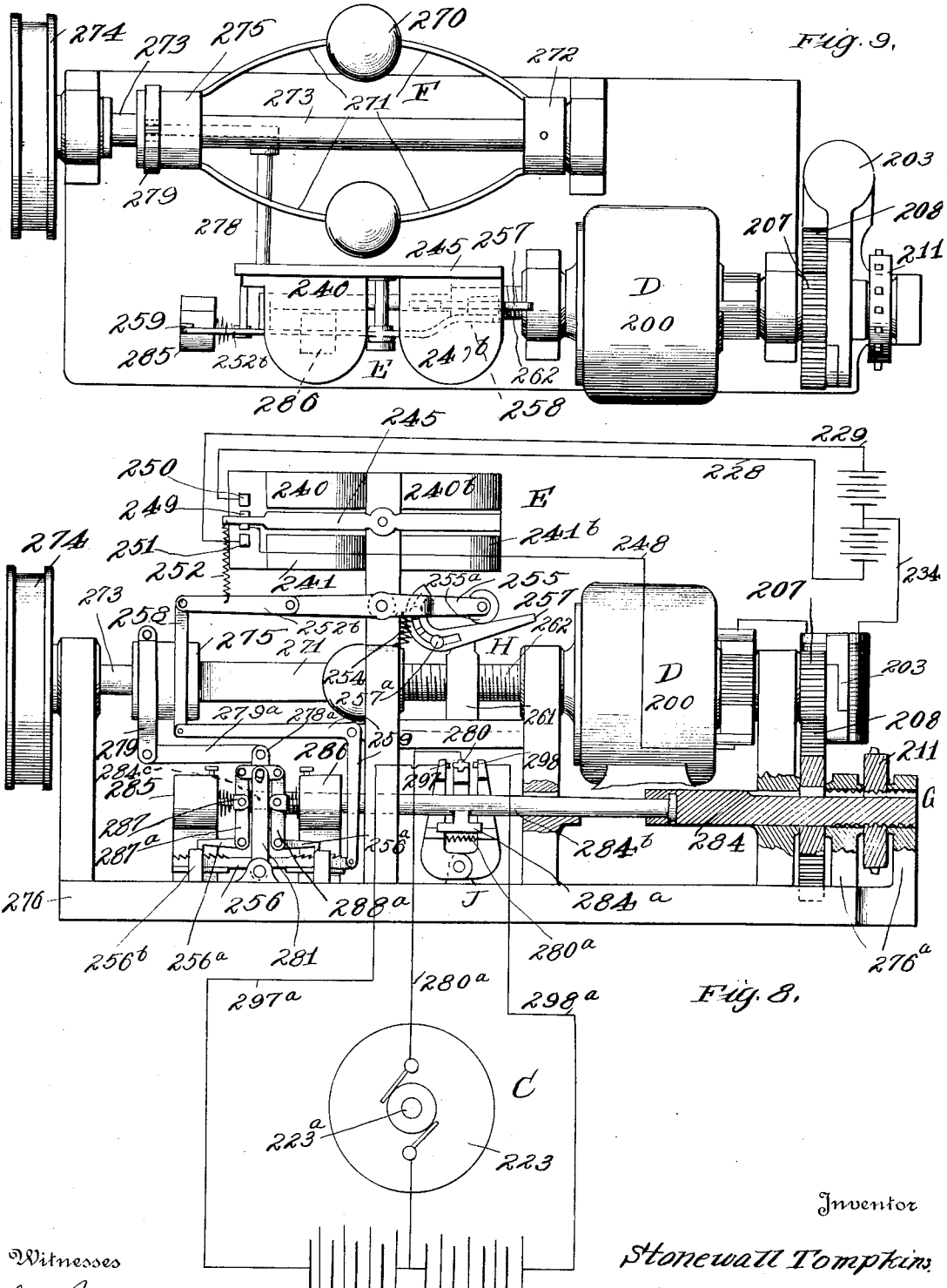

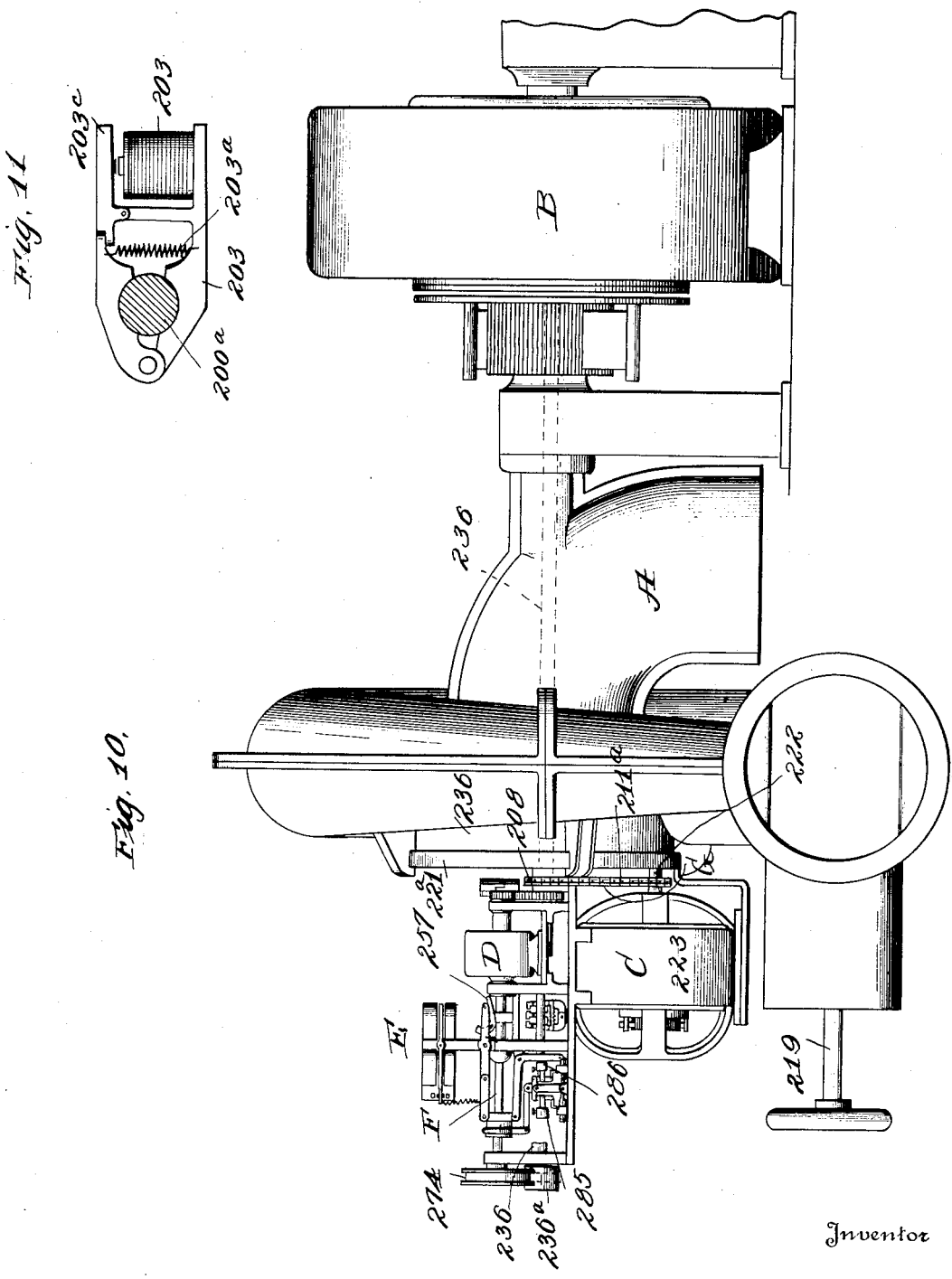

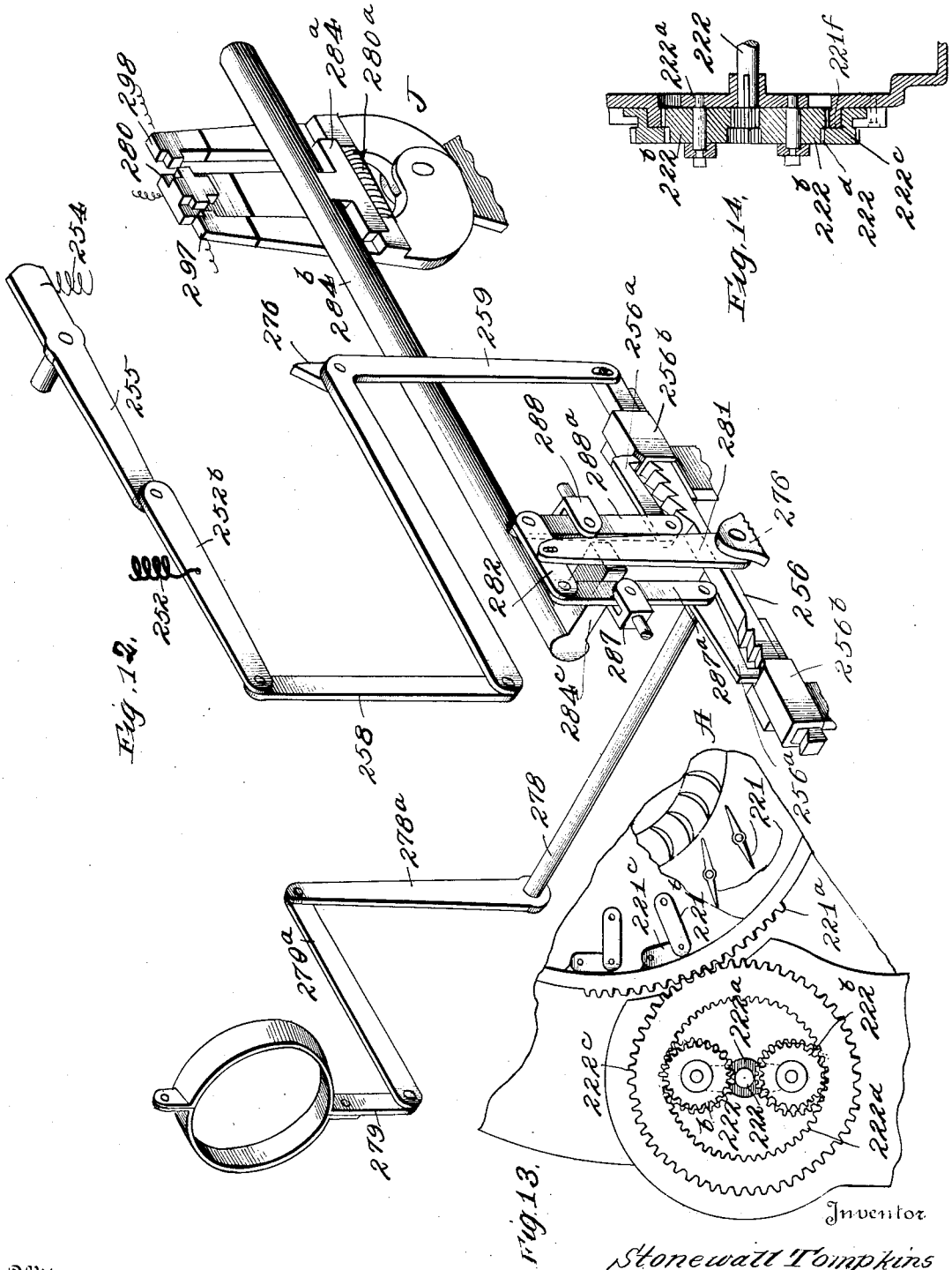

UNITED STATES PATENT OFFICE.

STONEWALL TOMPKINS, OF NEW YORK, N. Y.

AUTOMATIC SPEED-REGULATOR.

1,245,823.          Specification of Letters Patent.          Patented Nov. 6, 1917.

Application filed March 10, 1914. Serial No. 823,705.

*To all whom it may concern:*

Be it known that I, STONEWALL TOMPKINS, residing at New York city, in the county of New York and State of New York, and whose post-office address is 27 Pine street, said city, have invented certain new and useful Improvements in Automatic Speed-Regulators, of which the following is a specification.

This invention relates to a means for changing the power out-put of a prime mover or motor which drives an electric generator so as to meet the conditions of demand upon the generator for electric energy. The speed regulator can be adjusted so as to maintain the same speed at full load as at no load, or a higher speed at full load than at no load, or a lower speed at full load than at no load. It can also be adjusted to meet great irregularities of speed requirements, but there may be little need for such irregular adjustment, and the chief demand will be for constant speed.

The object is primarily to arrange the speed regulator so that any change in the demand on the generator for electric energy will cause the desired change in the power out-put of the prime mover or motor and this result will be produced where constant speed is desired, without necessity for a change of speed of the motor. In nearly all regulators of the prior art, a change in the speed of the motor is necessary to produce a change of power out-put of the motor. With the speed regulator of the present invention it is not claimed that there will be no change in the speed of the motor when a change of load occurs, but it is claimed that the change of speed is not a necessary factor in changing the power output of the motor, and it is further claimed that this departure from correct speed will be less with this speed regulator than with regulators in which a departure from correct speed is a necessary factor in their action.

It is important that the speed of the motor at no load shall be definitely fixed. To accomplish this I use a governor actuated by centrifugal force or the motive of an alternating current frequency meter or some other electric speed device, wherein the force changes when the speed changes, but which has a definitely fixed value for each definite speed. This same force is also utilized as a standard of reference for the speed at all loads, and a secondary object of the invention is therefore that at the end of a suitable interval after the primary action caused by change of load, the resultant speed will be compared with the standard speed and corrected if necessary, the proper length of this interval is variable being dependent largely upon the inertia of the driving medium, but the regulator is adjustable to meet different needs.

This regulator is applicable to any motor which can drive an electric generator, but the fullest understanding requires consideration of it as applied to a motor in which there is an appreciable time lag between a change in the supply of the driving medium and the resultant speed. Water wheels being typical motor of this class an illustrative embodiment of the invention as applied to a water wheel is disclosed in the accompanying drawings together with modified constructions of some of the elements entering into the system.

In the drawings:

Fig. 2, is an elevation partly in section of the primary governor on a larger scale;

Fig. 3 is a plan view of part of Fig. 2;

Fig. 4 is an elevation partly in section of the secondary governor and the actuator;

Figure 1:
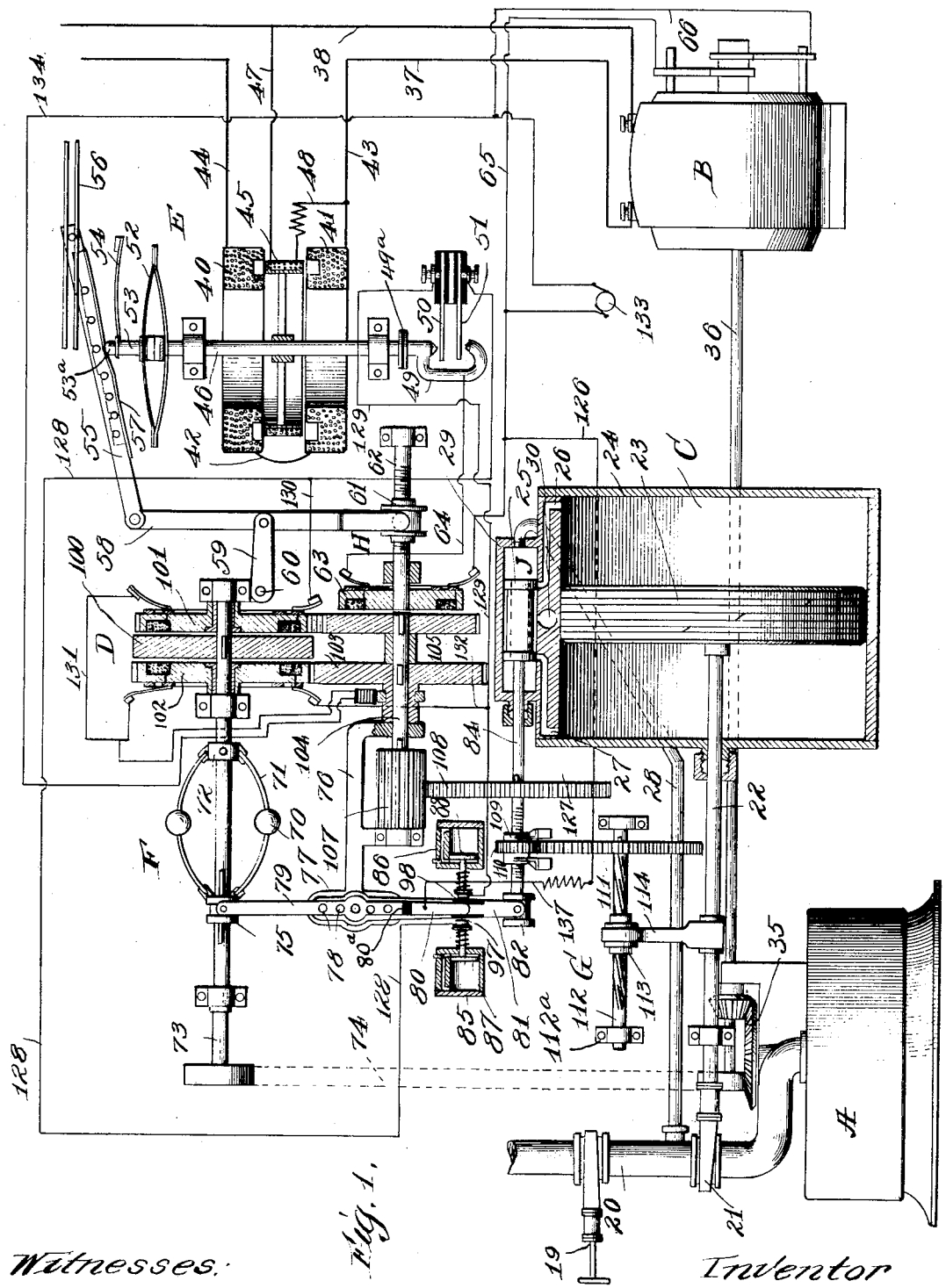
Figure 1 is a diagrammatic view of a complete regulating system embodying the several features of the invention.

Fig. 4ᵃ is a sectional view in larger scale of a detail;

Fig. 5 is a side view of the gears of the actuator;

Fig. 6 is a modified form of the primary governor shown in elevation and part section;

Fig. 7 is the necessary wiring for the primary governor, illustrated in Fig. 6;

Figs. 8 to 14 illustrate another modified form of construction where

Fig. 8 shows an elevation of the speed regulator with only a diagrammatic arrangement of the shifter;

Fig. 9 a plan view of Fig. 8;

Fig. 10 an elevation of a turbine with regulator attached and the generator driven by the turbine;

Fig. 11 a view of an electro-magnetic brake for the shaft of the actuator motor;

Fig. 12 shows some details of Figs. 8 and 9 in larger scale;

Fig. 13 a side view of the differential gearing which connects the shifter to the gates of the turbine;

Fig. 14 a section through the annular differential gearing of Fig. 13.

Referring more particularly to Fig. 1, A is the prime mover or the motor, B is the electric generator directly driven by the motor, C is the gate shifter, D the actuator, E the primary governor, F is a secondary governor or speed adjuster, G is the stopper, H the resetter and J the controller for the gate shifter.

The motor A in this case is represented by a water turbine which receives the water supply through a pipe 20 provided with hand operated valve 19 and a regulating valve 21, the latter carried on a rod 22 secured to the piston 23 of the gate shifter C. At one side of the housing 24 of the gate shifter C is provided a controller J having a valve 25 for controlling the water supply to either side of the piston 23 through ports 26 and 27. From the main water supply 20 a branch pipe 28 enters one end of the valve casing 29, and there is intercommunication through the valve 25 between both ends of the valve chamber. It is furthermore arranged so that with the valve in the middle position both ports 26 and 27 will be closed, but with the valve standing for instance to the left of the chamber, pressure will be supplied through port 26 to the right hand of the piston 23 while simultaneously water will be exhausted from its left side through port 27 and the centrally situated exhaust port 30. It will thus be seen that with the valve 25 moved to the left, the piston 23 will move to the right, and with the valve 25 moved to the right the piston will follow.

The generator B is driven by the motor A through a pair of bevel gears 35 and the shaft 36, and from the generator the current is led out to the line by conductors 37 and 38.

The primary governor E, see Figs. 1 and 2, consists of an upper stationary coil 40 and a lower stationary coil 41 which are electrically connected by means of conductor 42 and by conductors 43, 44 connected to conductor 37 of the line circuit. Between the two stationary coils, a movable coil 45 is carried concentrically with the stationary ones and this movable coil is adapted to travel up and down with a shaft 46 on which it is secured. Suitable annular recesses 40$^a$, 41$^a$ may be formed in the upper and lower coils to accommodate the movable coil when moved out of its central position between the stationary ones, and this movable coil is connected by means of conductors 47, 48 with conductors 38 and 37 respectively of the main line.

At the lower end of shaft 46 is attached a contact maker 49 suitably insulated as at 49$^a$ from the shaft 46 and provided with contact points adapted to contact with either of the two terminals 50 and 51 respectively. At the other end of shaft 46 are to be found two pairs of flat springs 52 which are intended to hold shaft 46 and the stump shaft 53 together. The stump shaft has a collar 53$^a$ under which another spring 54 engages to support it in axial direction and press it upward against the cam 57 of the resetter H which consists of a bar 55 with pivots at one end running between horizontal guides 56 and with an adjusting cam 57 the shape of which can be altered to cause variation of speed control. At the opposite end of the bar 55 is suspended a perpendicular rod 58 which near its middle is hinged to a link 59 adapted to oscillate around the stationary bolt 60. The lower end of rod 58 is fork shaped and engages between a pair of collars 61$^a$ on a slidable but non-revoluble nut 61 carried on a threaded shaft 62. At one end of this shaft is rigidly secured an electromagnetic clutch 63 which is connected through conductors 64 and 65 to the contact maker 49 and exciter 133 respectively.

The secondary governor or speed adjuster F, see Figs. 1 and 4, comprises a centrifugal governor with two revolving fly balls 70 carried on elastic arms 71 fastened to a ring 72 which is secured on a horizontal shaft 73 being constantly revolved by means of belt connection 74 from the generator shaft 36. The other ends of the governor arms are fastened to a sleeve 75 keyed so as to revolve with the shaft 73 but being axially displaceable thereon. At the end of a suitable frame 76 is a flat bearing piece 77 provided with one or more pin holes 78, any one of which being selectively adapted to serve as a fulcrum for the fly-ball lever 79. At the lower end of the fly ball lever is attached a contact piece 80, with suitable insulation 80$^a$. The fly-ball lever 79 has the same number of holes correspondingly spaced to the ones in the bearing piece 77, and the lower lever 81, which is also provided with similar holes, may be suspended from the same pivot pin by which the fly-ball lever 79 is fulcrumed to the frame 76. The free end of the lower lever is bifurcated as at 81$^a$, engaging between flanges on the guide collar 82 which is mounted at the free end of the valve spindle 84 attached to the piston valve 25. An electro-magnetic brake 103$^a$, similar to the one shown in Fig. 11, is mounted around the hub of gear 103. The braking pressure is applied by a spring which is overcome by the pull of an electro-magnet whenever current flows in the magnetic clutches. The braking pressure is thus applied as soon as the current is cut off.

Adjacent the contact piece 80 of the fly-ball lever 79 are situated two opposing dash pots 85 and 86 having each a plunger 87 and 88 which are normally pressed toward each other by means of springs 89 and 90. A bypass 91, 92 for the fluid, connects the two opposite ends of each of the dash pots respectively, and a screw 93 and 94 for each by-pass is provided, throttling its orifice. Each of the plungers has a flap valve 95, 96 adapted to retard the movement of the plunger when actuated by its spring—that is, the valves open on the outward, and close on the inward stroke of the plungers 87 and 88, see particularly Fig. 4$^a$. The adjacent ends of the plungers are provided with insulated metallic heads 97, 98.

The actuator D, see Figs. 1, 4 and 5, consists of the following parts: On the revolving shaft 73 of the secondary governor F is mounted and keyed a disk 100 of magnetic metal and on one side thereof running loose on the shaft 73 is provided an electromagnetic clutch 101 and on the opposite side of the disk 100, a similar clutch 102, also running loose on the shaft. This clutch 101 is made in the form of a gear wheel meshing with a gear wheel 105 mounted on the lower shaft 104 which is carried in bearings in the frame 76. The gear wheel 105 is of magnetic metal and both wheels 103 and 105 are secured on the shaft 104 which is in alinement with shaft 62 of clutch 63. A small intermediate pinion 106 is mounted so as to mesh both with the clutch 101 and the gear wheel 105. Also mounted on shaft 104 is a gear drum 107 meshing with the large gear wheel 108 mounted on the valve spindle 84. During displacement of the controller valve 25 to right or left, the gear wheel 108 will be similarly displaced but always remaining in mesh with the gear drum 107. The spindle 84 runs through a split bearing 109 within the jaws of which is carried a pinion 110 which is threaded on the inside and engages with corresponding threads on the spindle 84 so that when the pinion 110 is revolved, the spindle 84 with the controller valve 25 will be axially displaced. Another gear wheel 111 meshes with the pinion 110 and is keyed and mounted on the shaft 112 of the stopper G which is carried in bearings 112$^a$ parallel with the piston rod 22 of the gate shifter C. This shaft 112 has a very coarse thread and engages with a nut 113 non-revolubly carried on an arm 114 which is attached to the piston rod 22 and partakes of its axial movement. As a consequence, when the piston 23 travels to one side it drives the nut 113 in the same direction along the shaft 112 thereby revolving the latter with the gear wheels 111 and 110. The controller valve spindle 84 will then be moved together with the valve 25 in the opposite direction to which the piston 23 is moving. This motion will continue until the valve is restored to its middle position.

The electro-magnetic clutch 101 is connected to the lower terminal 51 of the primary governor E through conductor 130. The other collector ring of the clutch 101 connects with one collector ring of clutch 102 by means of conductor 131, and the other collector ring of the electro-magnetic clutch 102 connects by means of conductor 132 with the upper terminal 50 of the primary governor E. An exciter 133 is connected between the conductors 65 and 66 of the field circuit of the main generator B, and the conductor 66, through conductor 134 also connects with one of the contact rings of the electro-magnetic clutch 102.

In Figs. 6 and 7 is shown a modified form of a primary governor E constructed as a Kelvin balance. In this case two sets of stationary coils are used namely the upper ones 40$^a$, 40$^b$ and the lower ones 41$^a$ and 41$^b$ which are carried in a stand 146. In a frame 145 pivoted in the stand, so as to permit a slight up and down oscillation, are carried two movable coils 45$^a$ and 45$^b$ positioned so as to be moved by the attracting and repelling forces of the corresponding stationary upper and lower coils 40$^a$, 41$^a$ and 40$^b$, 41$^b$. One end of the frame has contact points 49$^a$ and 49$^b$ situated between the terminals 50$^a$, 51$^a$ with which the contact points on the frame are adapted to contact alternately as this end of the frame is drawn up or down toward the upper or lower left hand coil respectively, the reverse taking place at the opposite end of the frame. The opposite end of the frame is connected by means of a spring 152 with the balance lever 158 hung in the stand 146. At the free end of the balance lever 158 is provided a roller 53$^a$ which is pressed by a spring 154 into contact with the inclined surface of the wedge piece 57$^a$. This piece is movably carried by the seat 55$^a$ which has a threaded portion 61$^a$ engaging with the threaded clutch shaft 62 at the free end of which is mounted the electro-magnetic clutch 63 as already described. The turning of the shaft 62 of the resetter H will then cause a horizontal movement of seat 55$^a$ along the horizontal bar 56$^a$ upon which the leg 55$^b$ is supported. It will then be evident that, if the current in the coils of the Kelvin balance has drawn point 49$^b$ into contact with terminal 51$^a$, the resultant movement of stand 55$^a$, to the right, will increase or reset the tension of spring 152, until it balances the pull of the current and breaks the contact. In like manner contact between points 49$^a$ and 50$^a$ would be broken by the resultant movement of frame 55$^a$ toward the left.

This Kelvin balance is provided with electrical connections in the same manner as already described with regard to the primary governor E in Figs. 1 and 2. Instead of being directly connected to the main line the upper and lower stationary coils are, however, connected to current transformers 140 and 141 by means of the conductors 43ª, 43ᵇ, or 44ª, 44ᵇ. The left and right hand stationary coils are respectively interconnected by means of conductor 42ª and 42ᵇ. Similarly the movable coils 45ª and 45ᵇ are connected to potential transformers 142 and 143 by means of conductors 47ª, 47ᵇ, 48ª, 48ᵇ. The contact points on the frame 145 are, by means of conductor 64ª, connected to the exciter 133ª so is also one of the brushes for a collecting ring of the electro-magnetic clutch 63 by means of wire 64ᵇ. The other side of the exciter 133ª connects, through wires 134ᵇ and 134ª, with the coils of a pair of electro-magnets 135ª and 135ᵇ, one of which coils connect with the terminal 50ª through the wire 129ª, and the other coil from magnet 135ᵇ connects with the opposite terminal 51ª through the wire 128ª. A lever 124ª is fulcrumed between the two magnets 135ª and 135ᵇ so that when magnet 135ª draws armature 124ᵇ upward the insulated contact point 124ᵈ at the end of the lever 124ª will be made to contact with the terminal 123ª or the contact point 124ᵈ will make contact with terminal 122ª, if magnet 135ᵇ draws armature 124ᶜ upward.

*General description of the main parts.*

The shifter or gate shifter is the major motive device of the regulator and the term comprises any motive device (having sufficient power to turn on and off the source of power) which can be started, stopped and reversed as required. The gate shifter C is the motive device which operates the regulating valve of the prime mover A, in the present embodiment this is the gate 21 of the turbine, which gate, on being moved, will increase or decrease the power developed by the motor, which drives the generator B. The gate shifter may be any convenient type of motor which can properly operate the gate. As illustrated in Figs. 1 and 4 the gate shifter comprises a large hydraulic cylinder 24 with a piston 23, as well as pressure fluid connections therefor, but an electric motor or two clutches may be used as shown in Figs. 8, 9 and 10.

*Controller.*—This term comprises any controlling member or device J such as a valve switch or clutch which can start, stop and reverse the motion of the gate-shifter C. In Figs. 1 and 4 of the drawings, the valve 25 is the controller, but if the shifter were an electric motor the controller would be an electric switch, see Figs. 9 and 10.

*Actuator or minor motive device.*—This term comprises any motive device D (having sufficient power to operate or actuate the controller J) which can be started, stopped and reversed as required. The actuator D for the controller valve 25, in Figs. 1 and 4 is the motive device which actuates the valve 25 so that the latter will control the gate shifter C. It is the function of the actuator D to move the valve 25 away from its middle position but never to restore it to this position. When the valve is in the middle position, the motive power of the gate shifter C is cut off. When the valve 25 is on the right of its middle position the pressure fluid will be admitted to the left hand side of the gate shifter tending to move its piston 23 to the right; and when the valve is to the left of its middle position pressure will be admitted through port 26, tending to move the piston toward the left. In either case the piston will tend to move in the same direction as the valve has been moved, while fluid is exhausted through ports 27 and 30. In the first embodiment the actuator D consists of the magnetic clutches 101 and 102 as well as all the gears connecting them to the valve.

*Primary governor or electric load responsive governor.*—This term comprises any electro-magnetic device E operating under the influence of the current of the generator in such manner that a change in the command or generator output will induce the governor to cause the actuator D to move in the right direction and the approximately right amount to correspond to the new load. The primary governor E in Figs. 1, 2 and 3 is a device connected with the electric circuit of the power generator B, and its function is not only to start the actuator D when there is a change of load on the generator, but to start it, in the direction which will cause an approximately correct change of driving power according to whether the load be increased or decreased. The primary governor consists of the apparatus shown in Figs. 2 and 3 as well as the clutch 63. Figs. 6 and 7 show a modified form of primary governor, and Figs. 8, 9 and 10, a third modification of this governor.

*Secondary governor or speed responsive governor.*—This term comprises a centrifugal governor F or an electric speed indicator or other device which in connection with the special dash pots can make contacts which will correct the speed when necessary, after a change of load has altered the power output of the motor. The secondary governor F in Figs. 1 and 4 comprises the fly balls 70 and the levers 79 and 81 together with the dash pots and plungers.

*Stopper or restorer.*—This term comprises any device G or connection between the shifter and controller which—by the time the shifter has moved a proper distance for the change of load—will have restored the controller to the position which will stop the shifter. In Figs. 1 and 4 of the drawings the stopper G consists of the collar or very coarse thread nut 113 which is fastened to piston rod 22. This collar engages with a corresponding thread on rod 112 so that an axial movement of the collar will turn the rod, and by means of gear 111 will turn the pinion 110 which engages the thread on the valve stem 84 thereby moving the valve 25 to its middle position.

The action of the automatic regulator illustrated in Figs. 1 to 5, is as follows:

Ordinarily the regulating gate 21 of the turbine will not be used to shut off the water when the turbine is stopped, but an additional gate 19 will be used for this and if the apparatus is properly adjusted the regulating gate 21 will be open when the turbine is not running. Then if water be turned on and there is no load on the turbine it will gradually acquire speed. When the speed reaches its proper magnitude, the fly balls 70 will fly out and press the lever 79 against the left plunger head 97. This will start the actuator D by sending the current through the right hand main clutch 101 and cause the controller valve 25 to move to the left and subsequently the gate shifter piston 23 in the same direction, thus partly closing the gate 21. The movement of the controller valve to the left will soon cause the lower lever 81 to carry the plunger head 97 away from contact with the piece 80 of the upper lever, thus stopping the actuator D. The gate shifter will then stop as soon as the valve 25 has been restored to its middle position. The retardation of the plunger 87 will keep the plunger head 97 away from contact with the piece 80 during a suitable interval of time to test whether or not the resultant speed be correct. If the speed now should be right, the fly ball lever 79 will return to its vertical position away from contact with either of the plunger heads 97 and 98 and no further change will occur. But if the resultant speed should be found too low, the lever 79 will swing in opposite direction, so that the contact piece 80 will touch the right hand plunger head 98 and cause the controller valve 25 to move toward the right. The piston 23 will then shift the gate 21 toward the right, thus increasing the gate opening. If on the other hand the resultant speed should be too high, the spring will soon push the left plunger 87 in the right hand direction, thereby causing a further movement of the gate to the left. In this manner the speed will soon be corrected for no load.

The next step will now be to put a load on the generator. The start of current will then pull down the movable coil 45 of the primary governor E and make contact with the upper terminal 50 which will send a current through the left actuator clutch 102 causing the controller valve 25 to move to the right, and the piston of the gate shifter C together with the gate 21 in the same direction, thus increasing the power. Whenever either of the main clutches 101 and 102 of the actuator D is energized by a contact of the primary governor E, the lower right hand clutch 63 will also be energized. This will turn the screw 62 and change the tension of the suspension spring 52 of the primary governor. This change of tension will continue until it balances the downward pull of the current, breaks the contact and stops the action. In this way the controller valve 25 will be moved to an extent which is proportionate to the change of load, and since the gate shifter must move until it restores the valve 25 to its middle position it must move a distance proportionate to the change of load. If the shape of the sliding cam 57 has been properly constructed and all other parts of the apparatus have been properly adjusted, the gate opening should now be such as to supply proper power to maintain correct speed of the generator under load.

Supposing now that the gate opening is not quite correct then after a proper interval, the fly ball lever 79 will make contact with one or the other of the plunger heads 97, 98 and correct the gate opening. It will be understood that any movement of the controller valve 25 from its middle position, whether resulting from a contact of the primary governor E or of the speed adjuster F will swing the lower lever 81 away from its middle position and push back the one or the other of the plunger heads 97 or 98, the retarding action of the fluid in the dash pot 85 or 86 preventing the return of the plunger too soon. This makes a dead beat action and prevents "hunting" of the regulator.

Referring now to the modification illustrated in Figs. 8 to 14 inclusive, this also shows the regulator connected to a water turbine A of the Francis type. It includes as before a generator B, a shifter C, an actuator D, a primary governor E, a secondary governor F, a stopper G, a resetter H and a controller J, each of which performs practically the same function as the similarly named and denoted parts in the previously described figures, although of different construction.

The water turbine A is provided with the usual starting gate 219, which is hand or otherwise operated. Besides this gate the turbine is provided with a series of automatically adjustable water gates 221. These gates 221 are each journaled on a shaft attached to a lever $221^b$ which may be oscillated through the movement of the rack $221^a$ and the intermediary link $221^c$. This rack $221^a$ is actuated by means of a train of differential gears operated by the motor 223, see Figs. 13 and 14. On the motor shaft 222 is keyed a disk $222^a$ on which two pinions $222^b$ are journaled. These pinions have a double set of teeth, one set of which are in mesh with corresponding internal teeth on the turbine casing 221ᶠ and the other set of teeth on the pinions 222ᵇ being in mesh with corresponding internal teeth in a ring 222ᵈ which is mounted to revolve on the turbine housing. This ring is also provided with external teeth 222ᶜ which mesh with a tooth rack 221ᵃ. By means of this train of gears the rack and the links just described, the water gates 221 will be turned in the direction to open or to close the admittance of water to the turbine depending on the direction in which the motor 223 is running at the time.

The shifter C is here shown as an electric motor 223 and the controller J comprises a switch with two journaled arms 297 and 298 with a stationary upright 280 situated between the two arms. All three switch parts are properly insulated and electrically connected through wires 297ᵃ, 298ᵃ and 280ᵃ, respectively, with the motor 223, see particularly Figs. 8 and 13. In the normal position these arms 297 and 298 are held away from the upright 280 by means of a key 284ᵃ carried by a shaft 284ᵇ which will be described farther on. A spring 280ᵃ tends to hold the two arms 297 and 298 pressed against the key 284ᵃ. This switch 280, 297, 298 has the function of starting, stopping and reversing the motor 223 of the shifter C.

The actuator D comprises an electric motor 200 which actuates the switch of the controller J. This is done by means of the pinion 207 on the shaft of the motor 200 and a gear wheel 208 meshing with the pinion and keyed to the shaft 284 in such a manner that this shaft may be axially displaced in the gear wheel and in its bearings in the frame 276. This shaft 284 is journaled to the bar 284ᵇ so as to impart axial but not revoluble movement to the bar 284ᵇ.

The primary governor E is practically the same as has been shown in Figs. 6 and 7. It has two sets of stationary coils namely two upper ones 240 and 240ᵇ, and two lower ones 241 and 241ᵇ. In a frame 245 pivoted in the stand centrally between the upper and lower coils, so as to permit a slight up and down oscillation, are carried two other coils which are positioned so as to be moved by the attracting and repelling forces of the corresponding stationary upper and lower coils. One end of the frame 145 has contact points 249 situated between terminals 250 and 251 with which the contact points on the frame are adapted to contact alternately as this end is thrown up or down by the upper or lower left hand coil 240, 241, respectively, assisted by the lower and upper right hand coils 241ᵇ and 240ᵇ, respectively. The contact end of the coil frame 245 is provided with a spring 252, normally holding the frame in central position, away from the terminals 250 and 251. The other end of this spring is attached to a link 252ᵇ which at one end is hinged to the balance lever 255 and at the other end connected to a bell crank 259 through the intermediary of a second link 258.

The secondary governor F also resembles the one illustrated in Figs. 1 and 4 but it performs its work by acting on the spring 252. It comprises a centrifugal governor with two revoluble flyballs 270 carried on arms 271 fastened to a ring 272 which is secured on a horizontal shaft 273 revoluble by means of belt connection between pulleys 274 and 236ᵃ of which the latter is secured on the turbine shaft 236. The other ends of the governor arms are fastened to a sleeve 275 keyed so as to revolve with the shaft 273 but being axially displaceable thereon. This sleeve is provided with a groove for a collar 279, within which the sleeve revolves. As the balls 270 fly out or draw together, this collar 279 will consequently travel in the right or left direction respectively, with the sleeve 275, and thereby oscillating the rock shaft 278 by means of link 279ᵃ and arm 278ᵃ, which arm is keyed on the shaft. At the other end of the shaft 278, which oscillates in bearings in the frame 276, is keyed another arm 281 at its upper end connected with a plate 282. Symmetrically situated on each side of the arm 281 and in the direction of its oscillation is to be found a dash pot 285 and 286, respectively similarly constructed to what has already been described and shown in Figs. 1 and 4, these dash pots being also provided with by-passes and controlling valves. The plungers of the dash pot terminate in this case with hinges 287, 288 between which and the inner side of each dash pot is situated a compression spring tending to push the plungers toward each other. The hinges carry each an oscillating link 287ᵃ, 288ᵃ journaled near their middle in the hinges and at their upper ends to the plate 282. At the lower end of the links are provided ratchet pawls 256ᵃ which, with the parts in central position, engage with bevel surfaces of the guides 256ᵇ so as to be lifted out of engagement with the sliding rack 256, which runs in the guides 256ᵇ provided on the frame 276. One end of the sliding rack 256 is connected to one arm of the bell crank 259. This bell crank, as has been previously described, connects through its other arm with the link 252ᵇ and is at its elbow mounted to oscillate on the frame 276. At the free end of the bar 284ᵇ is a key 284ᶜ (see Fig. 12) which enters between the two links 287ᵃ and 288ᵃ so that the displacement of the bar 284ᵇ in one direction will push the link 287ᵃ the pawl 256ᵃ and the plunger head 287 outward oscillating around the hinge point in the plate 282 leaving the corresponding parts at the other dash pot undisturbed. It will then be evident that the ratchet pawl 256ª will slide up on the guide 256ᵇ without moving the rack bar 256. Similarly when the bar 284ᵇ moves in the opposite direction the pawl 256ª on that side will slide up the incline on the guide 256ᵇ. If, on the other hand the bar 284ᵇ remains stationary and the rock shaft 278 is oscillated together with the arm 281 actuated by the centrifugal governor, both the plunger heads 287 and 288 will remain stationary serving as fulcrums for the links 287ª 288ª, one of which will actuate its ratchet pawl 256ª so as to engage with and displace the rack bar 256 and with it the bell crank 259, while the pawl 256ª on the other side again slides up on the incline of its guide 256ᵇ.

The movement of shaft 278 and its connected parts is relatively quick and delicate to the slow and powerful movement of the bar 284ᵇ; hence it is obvious that the plunger heads will remain stationary to the action of the secondary governor and yield to the action of the actuator D or shifter C.

The stopper G consists of a chain belt 211ª driven by a pinion on the shaft 222 of the motor 223 and running over a chain pulley 211 which is provided with internal threads engaging with corresponding ones on the shaft 284. This chain pulley 211 is mounted between two smooth bored bearings 276ª so that when the chain revolves the pulley 211, the shaft 284 will be made to travel in its axial direction through the bearings bringing with it the bar 284ᵇ. On the other hand when the chain pulley 211 is held stationary by the chain, and the gear wheel 208 is revolved by the motor 200, the shaft 284 will again receive an axial displacement through its engagement with the chain pulley 211.

The resetter H consists in this modification of a screw 262 forming an extension of the shaft 200ª of the motor 200, a nut 261, a wedge piece 257 and a balance lever 255. The nut 261 is guided so as not to turn in the frame 276 and the wedge piece 257 has an arcuate slot so as to be adjusted by means of a set screw 257ª on the nut 261 in order to present a more or less steep inclination for the roller 255ª carried at the end of the balance lever 255. The balance lever 255 is constantly drawn downward by a spring 254 connecting it with the frame 276 in order to insure a continuous contact between its roller and the wedge piece 257.

On the shaft 200ª of the motor 200 is provided an electrically actuated brake 203, see Figs. 8, 9 and 11, and by normal running of the generator B, this brake is tightly clamping shaft 200ª actuated by a spring 203ª. As soon, however, as current passes over the wires 248 connecting the contact point 249 with the motor 200 and any one of the wires 228, 229, 234, the electromagnet 203ᵇ which is also connected with these wires will be energized and attract the armature 203ᶜ, thereby releasing the grip of the brake on the motor shaft 200ª.

The operation of the apparatus disclosed in Figs. 8 to 14 is as follows, assuming that the turbine speed is correct and that its gates 221 have been properly set to maintain this speed with the existing load, we will now suppose that the load on the line is changed. The first effect of this change will be that the contact point 249 on the coil frame 245, see Fig. 8, will make contact with one of the terminals 250 or 251, depending on whether the load has been increased or decreased. This will start the motor 200 of the actuator D which will rotate the screw 262, thereby moving the nut 261 with the wedging piece 257 of the resetter H until the contact point is drawn away from contact with one of the terminals 250 or 251 and return the frame 245 into its central position. This will stop the motor 200 which, however, in the meantime will have rotated the screw shaft 284, situated below the motor, by means of gears 207, 208. As a consequence the shaft 284 has traveled to the left or to the right according to the direction of rotation of the motor 200 which is determined according to whether the point 249 was in contact with terminal 250 or terminal 251. The screw 284 will therefore have imparted an axial movement to the bar 284ᵇ which as has already been described is connected to the shaft 284 so as not to revolve, but to partake of its axial displacement. This travel of the bar 284ᵇ will have caused contact between one of the contact points on the upright 280 with one or the other of the terminals of the oscillating arms 297 or 298, and this contact will in its turn have started the motor 223 of the shifter C. And this motor, controlling the train of differential gears 222ª, 222ᵇ, 222ᶜ, 222ᵈ, will then turn the rack 221ª up or down actuating the links 221ᵇ, 221ᶜ and closing or opening the gates 221 of the turbine A so as to suit the new load. The rotation of the motor 223 will continue until the chain gear 211ª, 211 of the stopper G has moved the shaft 284 with the bar 284ᵇ back to the central position, thus breaking the contact between the upright 280 and the terminal on arm 297 or 298. There will now be no further action until another change of load occurs, or unless the resultant speed fails to be exactly correct. In the latter case the secondary governor F on the axial movement of the collar 275 actuated by the balls 270 will shift the collar 279, see Figs. 8 and 12, which will cause one of the ratchet pawls 256ª to move the rack bar 256 either to the right or to the left depending on which direction the collar 279 has moved. By means of the bell crank 259, links 258, 256, the tension on the spring will be changed so as to make a new contact between the contact point 249 on the coil frame 245 and one or the other of the terminals 250 or 251 and thus correct the speed.

There is a particular condition when it is desired that a movement of the governor collar 279 in an axial direction or a movement of either dash pot piston in the direction its spring moves it, shall cause an alteration in the tension of spring 252. It is not desired that axial movement of collar 279 or the aforesaid movement of the dash pot piston shall alter the tension of the spring 252 except under the said particular condition. This particular condition is when the speed remains wrong for more than the prescribed time after the governing mechanism has altered the power for the purpose of restoring correct speed. The operation for this particular case is as follows: Whenever the governing mechanism is acting, the arm 284 is not in its central position. Therefore projection 284ᶜ is not in its central position. The displacement of 284ᶜ from its central position will place one or the other of pawls 256ᵃ so it can not be made to move rod 256 even if collar 279 does move. The effect of the dash pots 285 and 286 is to delay the return of the pawl to its operative position for an interval of time after projection 284ᶜ has been restored to its central position. This allows proper time for correct speed to be restored, if the governing mechanism has acted with exact correctness.

The dash pots 285 and 286 have check valves in their pistons so as to cause retardation of the action of the springs only and not retardation to displacement caused by movement of the projection 284ᶜ. The adjustment valves in the by-passes are for the purpose of adjusting the interval of time required for the springs to restore the pistons to their normal position.

In the expression prime mover in the claims may be included any suitable motor, such as turbine, gas or steam engine or dynamo; and the expression "gate" does therefore comprise suitable starting or shutting off devices, such as water gates, valves or switches.

I claim:—

1. An automatic speed regulator for a prime mover; comprising a major motive device adapted to alter the power delivered to the prime mover; a controlling member adapted to control the movements of the major motive device by occupying a cut off position, a forward position and a rearward position for respectively cutting off the motive power or applying it in either forward or rearward direction of the major motive device; a minor motive device adapted to move the controlling member; a speed responsive governor adapted to cause the minor motive device to move the controlling member into forward position when the speed falls below correct value and into backward position when the speed rises above correct value; an indirect connection between the speed responsive governor and the controlling member, said connection causing temporary destruction of the effect of the speed responsive governor after sufficient departure of the controlling member from its cut off position.

2. An automatic speed regulator for a prime mover; comprising a major motive device adapted to alter the power delivered to the prime mover; a controlling member adapted to control the movements of the major motive device by occupying a cut off position, a forward position and a rearward position for respectively cutting off the motive power or applying it in either forward or rearward direction of the major motive device; a minor motive device adapted to move the controlling member; a speed responsive governor adapted to cause the minor motive device to move the controlling member into forward position when the speed falls below correct value, and into backward position when the speed rises above correct value; an indirect connection between the speed responsive governor and the controlling member; said connection causing temporary destruction of the effect of the speed responsive governor upon the minor motive device after sufficient departure of the controlling member from its cut off position.

3. An automatic speed regulator for a prime mover comprising an electric generator adapted to be driven by the prime mover; a major motive device adapted to alter the power delivered to the prime mover; a controlling member adapted to control the movements of the major motive device; a minor motive device adapted to move the controlling member; an electric load responsive governor responsive to the load on the generator adapted to cause the minor motive device to move the controlling member; an electric clutch connection between the electric load responsive governor and the minor motive device, said connection causing said minor motive device to cut off its own source of power, when the movement reaches approximately its own correct value.

4. An automatic speed regulator for a prime mover comprising an electric generator adapted to be driven by the prime mover; a motive device adapted to change the supply of power to said prime mover; an electric load responsive governor adapted to cause the motive device to act when the generator load changes; a connection including an electric clutch between the motive device and the electric load responsive governor, said connection causing the approximately correct movement of the motive device, when the change of load is sufficient to seriously alter the speed.

5. An automatic speed regulator for a prime mover comprising an electric generator adapted to be driven by the prime mover; a major motive device adapted to alter the power delivered to the prime mover; a controlling member adapted to control the movements of the major motive device; a minor motive device adapted to move the controlling member; an electric load responsive governor adapted to control the minor motive device; a clutch connection between the minor motive device and the electric load responsive governor, said connection causing the approximately correct movement of the minor motive device when the change of load is sufficient to seriously alter the speed.

6. An automatic speed regulator for a prime mover comprising an electric generator adapted to be driven by the prime mover; a shifter adapted to change the supply of power medium to the prime mover, a controller adapted to control the shifter, two separate governors responsive respectively, to the speed of the prime mover and to the output of the generator, an electric actuator for said controller adapted to be energized through the intermediary of either of said governors, and indirect connections through which the respective governors are reset or modified whenever the controller is actuated.

7. An automatic speed regulator for a prime mover comprising an electric generator adapted to be driven by the prime mover; a shifter adapted to change the supply of power medium to the prime mover, a controller adapted to control said shifter, two separate governors responsive respectively, to the speed of the prime mover and to the output of the generator, an electric actuator for said controller adapted to be energized through the intermediary of either of said governors, and indirect connections through which the respective governors are readjusted whenever the controller is actuated, one of said connections being moved directly by the actuator and the other by the controller.

8. A system for automatic speed regulation of a prime mover driving an electric generator; comprising a shifter movable in opposite directions to increase or decrease the supply of power to the prime mover, a controller movable in opposite directions to determine the movement of said shifter, an actuator for moving said controller, a governor effected by changes in the operation of the system, connections through which said governor moves the actuator in opposite directions for effecting both increase and decrease in supply of power to the prime mover; said connections comprising revoluble electro-magnetic clutches, circuits adapted to reverse the effect of said clutches, and separate circuit closers operating by opposite movements of the governor.

9. An automatic speed regulator for a prime mover comprising an electric generator driven by the prime mover; a member directly regulating the power supply to said prime mover, a valve for controlling the ports supplying pressure fluid to either side of said member; an electro-magnetic governor influenced by the current from said generator, a speed governor influenced by the speed of the prime mover; and means actuating said valve and connecting it with the two governors; said speed governor having a fulcrumed lever actuated by change of speed, an insulated contact piece on said lever, a dash pot on either side of said contact piece, each having a plunger with an insulated metallic head standing in position to impinge with said contact piece; a second lever connecting with said valve and being oscillated thereby to impinge with and push back said plungers.

10. An automatic speed regulator for a prime mover comprising an electric generator driven by the prime mover; a member directly regulating the power supply to said prime mover, a valve for controlling the ports supplying pressure fluid to either side of said member; an electromagnetic governor influenced by the current from said generator; a speed governor influenced by the speed of the prime mover; and means actuating said valve and connecting it with the two governors; an electro-magnetic clutch brake influencing the movement of said valve to prevent over travel thereof.

11. An automatic speed regulator for a prime mover comprising an electric generator driven by the prime mover; a member directly regulating the power supply to said prime mover, a device for controlling the supply and direction of motive force to said member; an electro-magnetic governor influenced by the current from said generator; a speed governor influenced by the speed of the prime mover; and means actuating said device and connecting it with the two governors; and other means actuated by said member for returning said device to its inoperative position.

12. An automatic speed regulator for a prime mover comprising an electric generator driven by the prime mover, a member directly regulating the power supply to said prime mover, a device for controlling the supply and direction of motive force to said member; an electro-magnetic governor influenced by the current from said generator; a speed governor influenced by the speed of the prime mover; and means actuating said device and connecting it with the two governors, a gearing actuated by said member, said gearing comprising an axially displaceable shaft connected with said device, and a gear wheel having internal threads engaging with corresponding threads on said shaft; whereby said device will be returned to its inoperative position by the movement of said member.

13. An automatic speed regulator for a prime mover comprising an electric generator driven by the prime mover; a member directly regulating the power supply to said prime mover, a valve for controlling the ports supplying pressure fluid to either side of said member; an electro-magnetic governor influenced by the current from said generator; a speed governor influenced by the speed of the prime mover; and means actuating said valve and connecting it with the two governors; and other means actuated by said member for returning said valve to its closed position.

14. An automatic speed regulator for a prime mover comprising an electric generator driven by the prime mover; a member directly regulating the power supply to said prime mover, a valve for controlling the ports supplying pressure fluid to either side of said member; an electro-magnetic governor influenced by the current from said generator; a speed governor influenced by the speed of the prime mover; a carrier rigidly secured to said member and having a nut portion with coarse pitch, a shaft engaging with said nut portion and carrying a gear wheel, a pinion in mesh with said gear wheel having internal threads of fine pitch, a stationary bearing for said pinion permitting rotation but no displacement of said pinion, a piston rod on said valve engaging with the threaded part of said pinion; whereby said valve will be returned gradually to its central position by the movement of said member.

15. An automatic speed regulator for a prime mover comprising an electric generator driven by the prime mover; a member directly regulating the power supply to said prime mover, a valve for controlling the ports supplying pressure fluid to either side of said member; an electro-magnetic governor influenced by the current from said generator; a speed governor influenced by the speed of the prime mover, means for actuating said valve comprising an electro-magnetic clutch for driving the valve in one direction and another electro-magnetic clutch for driving it in the other direction, said clutches being influenced by one of said governors.

16. An automatic speed regulator for a prime mover comprising an electric generator driven by the prime mover; a member directly regulating the power supply to said prime mover, a valve for controlling the ports supplying pressure fluid to either side of said member; an electro-magnetic governor influenced by the current from said generator; a speed governor influenced by the speed of the prime mover, means for actuating said valve comprising an electro-magnetic clutch for driving the valve in one direction and another magnetic clutch for driving it in the other direction, said clutches being influenced by said electro-magnetic governor and said speed governor respectively.

17. An automatic speed regulator for a prime mover comprising an electric generator driven by the prime mover; a member directly regulating the power supply to said prime mover, a valve for controlling the ports supplying pressure fluid to either side of said member; an electro-magnetic governor influenced by the current from said generator; a speed governor influenced by the speed of the prime mover, means for actuating said valve comprising an electro-magnetic clutch for driving the valve in one direction and another magnetic clutch for driving it in the other direction, said clutches being influenced by said electro-magnetic governor and said speed governor respectively; and means actuated by said member for returning said valve to its central position.

The foregoing specification signed at New York, N. Y., this 17th day of February, 1914.

STONEWALL TOMPKINS.

In presence of two witnesses:
S. J. GENSLER,
M. FRIEDMAN.